United States Patent
Henry et al.

(10) Patent No.: US 7,062,534 B1
(45) Date of Patent: Jun. 13, 2006

(54) INFORMATION CACHING SYSTEM AND METHOD

(75) Inventors: Steven G Henry, Ft Collins, CO (US); Gerald L Meyer, Ft Collins, CO (US); Martha A Chavez, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 543 days.

(21) Appl. No.: 09/576,093

(22) Filed: May 22, 2000

(51) Int. Cl.
*G06F 15/16* (2006.01)

(52) U.S. Cl. ..................................... 709/206
(58) Field of Classification Search ................. 709/206
See application file for complete search history.

(56) References Cited

U.S. PATENT DOCUMENTS

| | | | | |
|---|---|---|---|---|
| 5,455,579 A | * | 10/1995 | Bennett et al. | 341/110 |
| 5,999,932 A | * | 12/1999 | Paul | 707/10 |
| 6,230,237 B1 | * | 5/2001 | Tao et al. | 711/108 |
| 6,405,243 B1 | * | 6/2002 | Nielsen | 709/206 |
| 6,427,164 B1 | * | 7/2002 | Reilly | 709/206 |

* cited by examiner

Primary Examiner—David Y. Eng

(57) ABSTRACT

The present disclosure relates to a system and method for processing sending information in a sending device. The method comprises receiving at least a fragment of a destination address/number to which information is to be sent; cross-referencing the address/number fragment with a database assigned to the user to see if the address/number matches an address/number saved for that user; and automatically caching the address/number in the user's database if it has not been previously saved. The system therefore comprises logic configured to receive at least a fragment of a destination address/number to which information is to be sent; logic configured to cross-reference the address/number fragment with a database assigned to the user to see if the address/number matches an address/number saved for that user; and logic configured to automatically cache the address/number in the user's database if it has not been previously saved.

21 Claims, 5 Drawing Sheets

INFORMATION CACHING SYSTEM AND METHOD

FIELD OF THE INVENTION

The present disclosure relates to an information caching system and method. More particularly, the present disclosure relates to an information caching system and method in which destination e-mail addresses and facsimile numbers are automatically stored for each user of a sending device.

BACKGROUND OF THE INVENTION

Presently, a growing number of devices are being developed to take advantage of the Internet and e-mail communications. One example of such a device is a digital sender such as the HP 9100C from The Hewlett-Packard Company. Digital senders are devices which allow a user to send color and black-and-white documents (i.e., hard copies) via e-mail, as well as facsimile (fax). These senders are used in similar manner to conventional fax machines, wherein the user feeds the document that is to be sent into the device. Once fed into the device, the document is scanned and reduced to electronic form so that it can be sent to an e-mail and/or fax recipient. Sending documents with such a device has several advantages including increased speed, increased reliability, and higher resolution.

Digital senders currently are configured as free-standing units which can be connected to, for example, an office network such that several different people can use the sending device. When sending a document, the user normally must manually enter a destination e-mail address or fax number. In addition, the user can send a document to multiple persons by entering multiple e-mail addresses and/or fax numbers.

As can be appreciated by those familiar with e-mail communication, it can be tedious for a user to enter e-mail addresses, particularly where the user wishes to send to multiple parties. Although the user normally can store addresses in a personal address book (typically accessed by entry of a password), currently an external personal computer (PC) provided with appropriate software must be used to download this information to the sending device. Moreover, where the user fails to save his or her addresses and/or fax numbers when they are used, this information must be manually re-entered each time the sender sends to those addresses and/or fax numbers.

From the foregoing, it can be appreciated that it would be desirable to have means to more easily save sending information such as e-mail addresses and/or fax numbers for each user of a shared sending device. Moreover, it would be desirable to have a convenient means for each user to later access this sending information.

SUMMARY OF THE INVENTION

The present disclosure relates to a system and method for processing sending information in a sending device. The method comprises receiving at least a fragment of a destination address/number to which information is to be sent; cross-referencing the address/number fragment with a database assigned to the user to see if the address/number matches an address/number saved for that user; and automatically caching the address/number in the user's database if it has not been previously saved. The system therefore comprises logic configured to receive at least a fragment of a destination address/number to which electrical information is to be sent; logic configured to cross-reference the address/number fragment with a database assigned to the user to see if the address/number matches an address/number saved for that user; and logic configured to automatically cache the address/number in the user's database if it has not been previously saved.

In a preferred arrangement, the caching process occurs in a digital sender which is capable of sending to e-mail addresses and/or fax numbers. In such an application, the e-mail addresses and fax numbers entered by the user are automatically cached within the device such that when the user again wishes to send to these e-mail addresses and/or fax numbers, he or she can select them from a personal database or the sender can automatically provide them to the user as the user enters each address and/or number.

The features and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
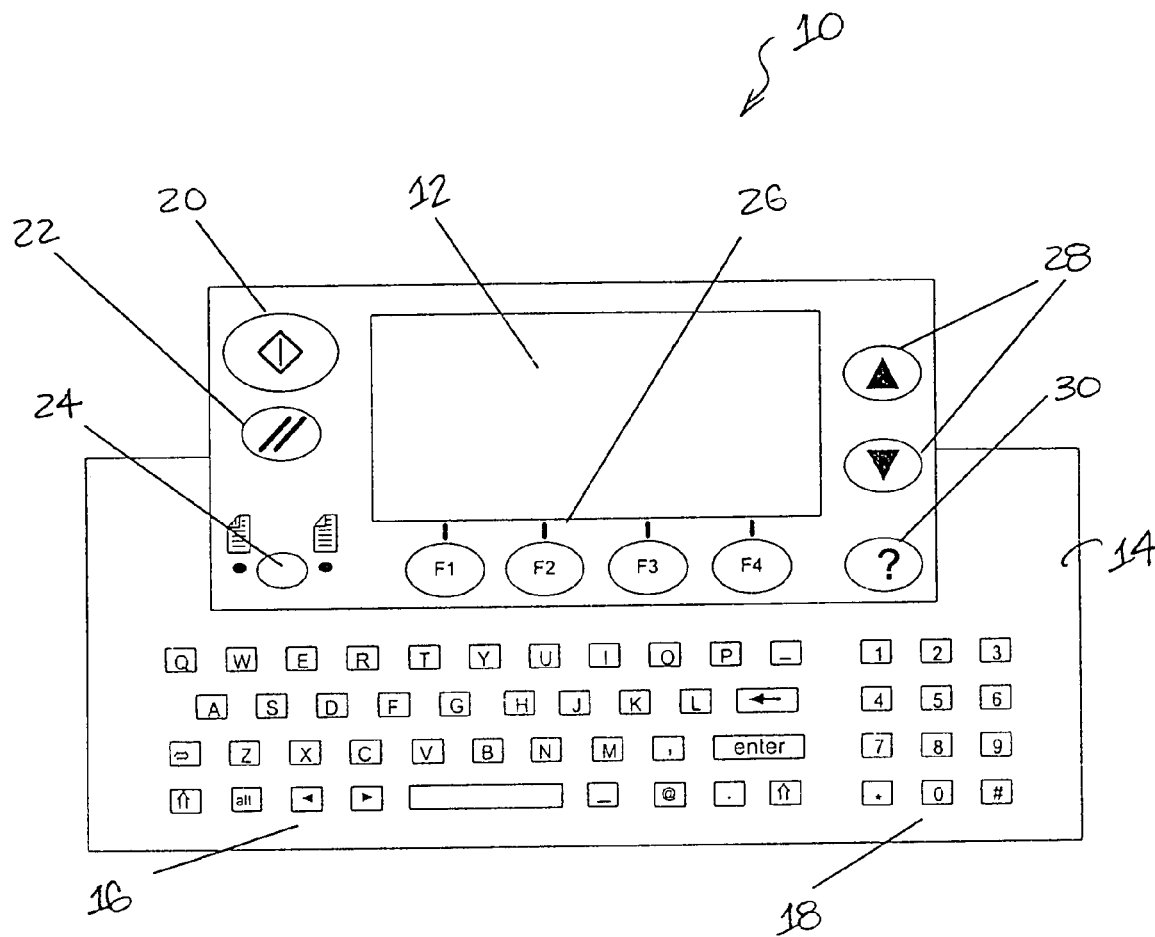
FIG. 1 is a schematic view of the operation panel of a sending device in which the present invention can be used.

Referring now in more detail to the drawings, in which like numerals indicate corresponding parts throughout the several views, FIG. 1 illustrates an operation panel 10 of a sending device of the type in which the present invention can be utilized. As indicated in this figure, the operation panel 10 can generally include a display 12 and a keyboard 14. As known in the art, the display 12 typically comprises a liquid crystal display (LCD), although other conventional displays can be used such as light emitting diode (LED) displays, and the like. By way of example, the keyboard 14 can include an alphabetic keyboard 16 as well as a numeric keypad 18. In addition to the various keys contained within the alphabetic keyboard 16 and the numeric keypad 18, the sending device 10 can optionally further include a plurality of buttons including, for instance, a send button 20, a cancel button 22, a simplex/duplex button 24, a plurality of function keys 26, selection keys 28, and a help key 30. Although a sending device is described herein by way of example, it is to be understood that the application of the present invention is not limited to such sending devices, but also includes use in substantially any device that is used to transmit information to an e-mail address and/or a fax number. Accordingly, the principles of the present invention apply equally to fax machines as well as e-mail programs generally.

Figure 2:
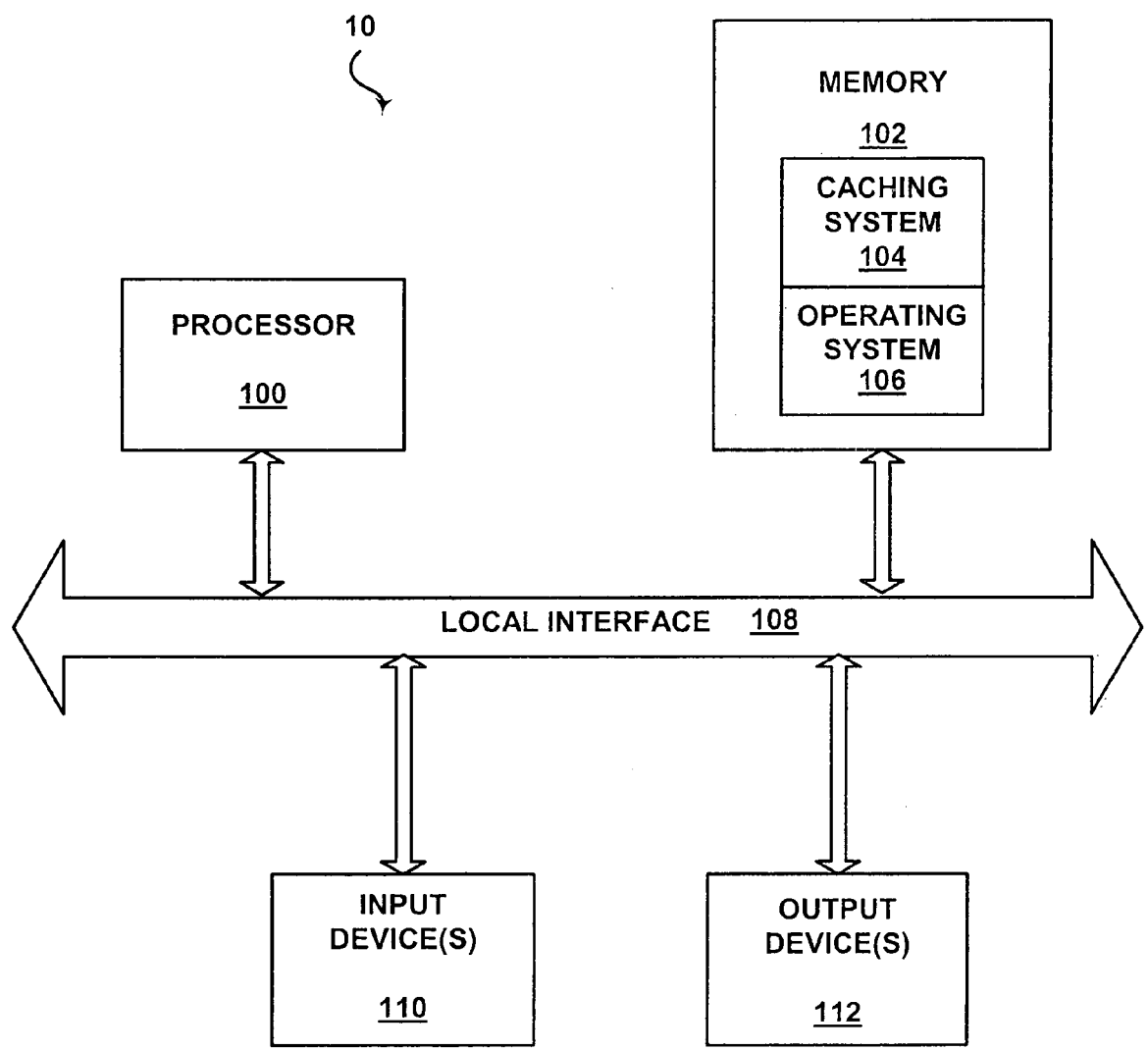
FIG. 2 is a block diagram of the sending device shown in FIG. 1.

FIG. 2 illustrates the functional components of the sending device shown schematically in FIG. 1. As depicted in FIG. 2, the sending device 10 typically comprises a processor 100, a memory 102, a local interface 108, an input device 110, and an output device 112. Typically, the memory 102 includes, inter alia, a caching system 104, as well as an operating system 106. If, as indicated in FIG. 1, the sending device 10 includes a keyboard 14, the input device 110 can comprise one or more of the keys of this keyboard 14.

As will be appreciated by those having ordinary skill in the art, the sending device can be implemented in software, hardware, or a combination thereof. It is to be noted that when implemented in software, the digital sender can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 3:
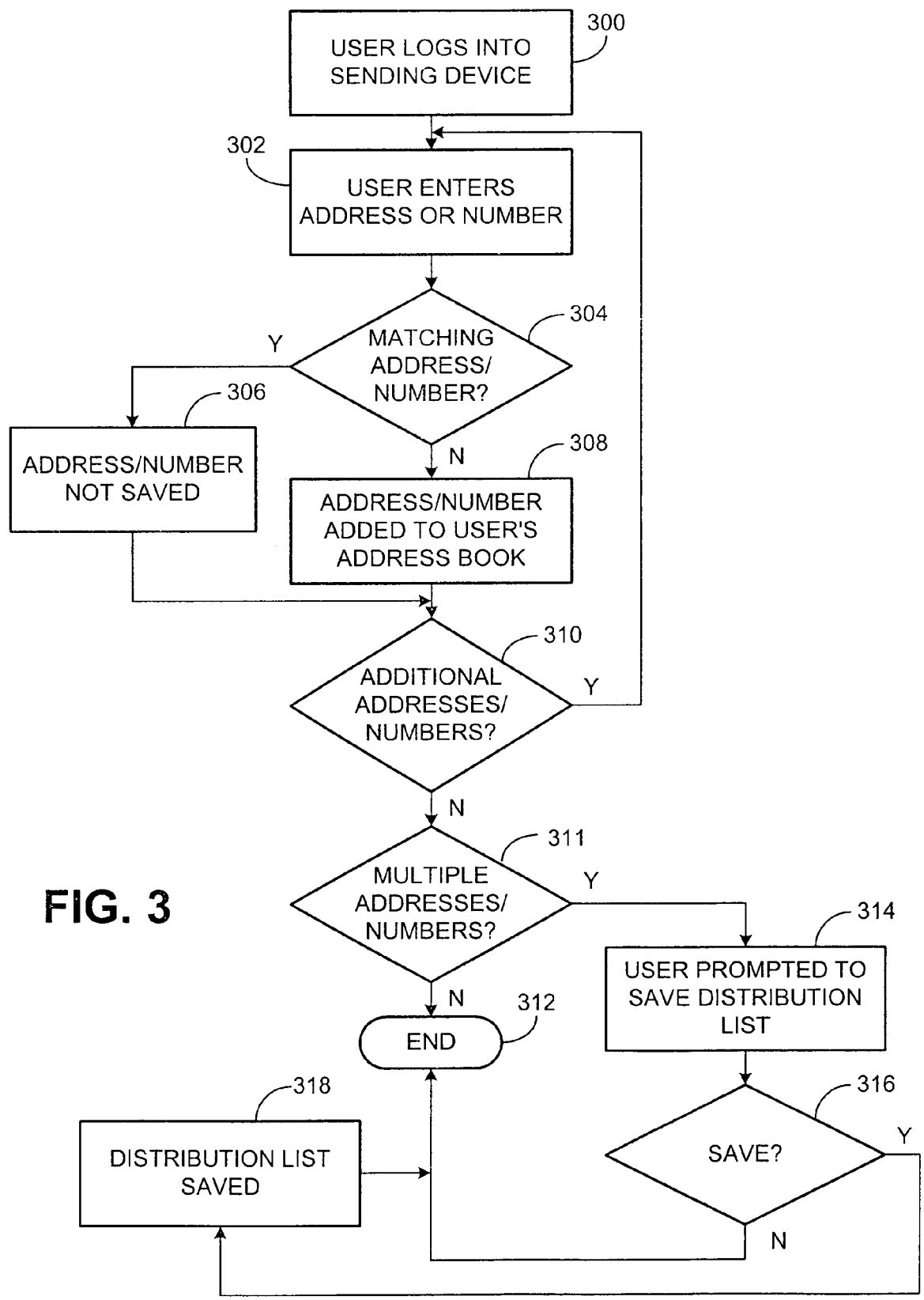
FIG. 3 is a flow diagram identifying a sending information caching process in accordance with the principles of the present invention.

With reference to FIG. 3, a sending information caching process in accordance with the principles of the present invention will be discussed. As indicated at block 300, the user first logs into the sending device, by way of example, by both entering a user name as well as a password. In the office environment, this user name and password will be either assigned to or selected by each employee that will be permitted to use the sending device. If desired, an office administrator can be selected to maintain records of each person's user name and password. After the user has logged in, he or she can enter an e-mail address or fax number as indicated in block 302. After the address or number has been entered by the user, the system determines whether that address or number has previously been saved in that particular user's address book within the device memory. As indicated at 304, if the address or number matches one that has already been entered by the user, the address or number is not saved, as indicated at block 306. If, on the other hand, the entered address or number does not match any such addresses or numbers stored in the user's address book, the entered address or number is saved to the user's address book as indicated in block 308. As will be appreciated by persons having ordinary skill in the art, the user and/or the administrator can be provided with the option to disable the automatic caching system on an individual or global basis.

As indicated in FIG. 3, flow continues from blocks 306 and 308 to 310. As indicated at block 310, if additional addresses and/or numbers are not entered, the caching process ends as indicated at block 312. If, however, the document to be sent is also to be transmitted to other addresses an/or numbers, flow continues back to 304 via 310 where the caching process for the individual new addresses and/or numbers can take place. Once every address and/or number has been entered, the user can be prompted to save the collection of e-mail addresses and/or fax numbers in a distribution list as indicated at block 314. As indicated at block 316, if the user declines to save these addresses and/or numbers as a distribution list, the caching process again ends at 312. Alternatively, if the user does wish to save the collection of addresses and/or fax numbers in a distribution list, these addresses and/or numbers can be saved in the device memory as indicated in block 318. Where an individual e-mail address, fax number, or distribution list is stored, the user typically will be provided with an opportunity to save the individual address/number or list under a "friendly" name. Specifically, the user will be able to enter a familiar name that will be associated with the address/number or list such that, at a later time, the user will be able to recall the address/number or list by simply entering the friendly name or by selecting this friendly name from his or her stored address book.

Figure 4:
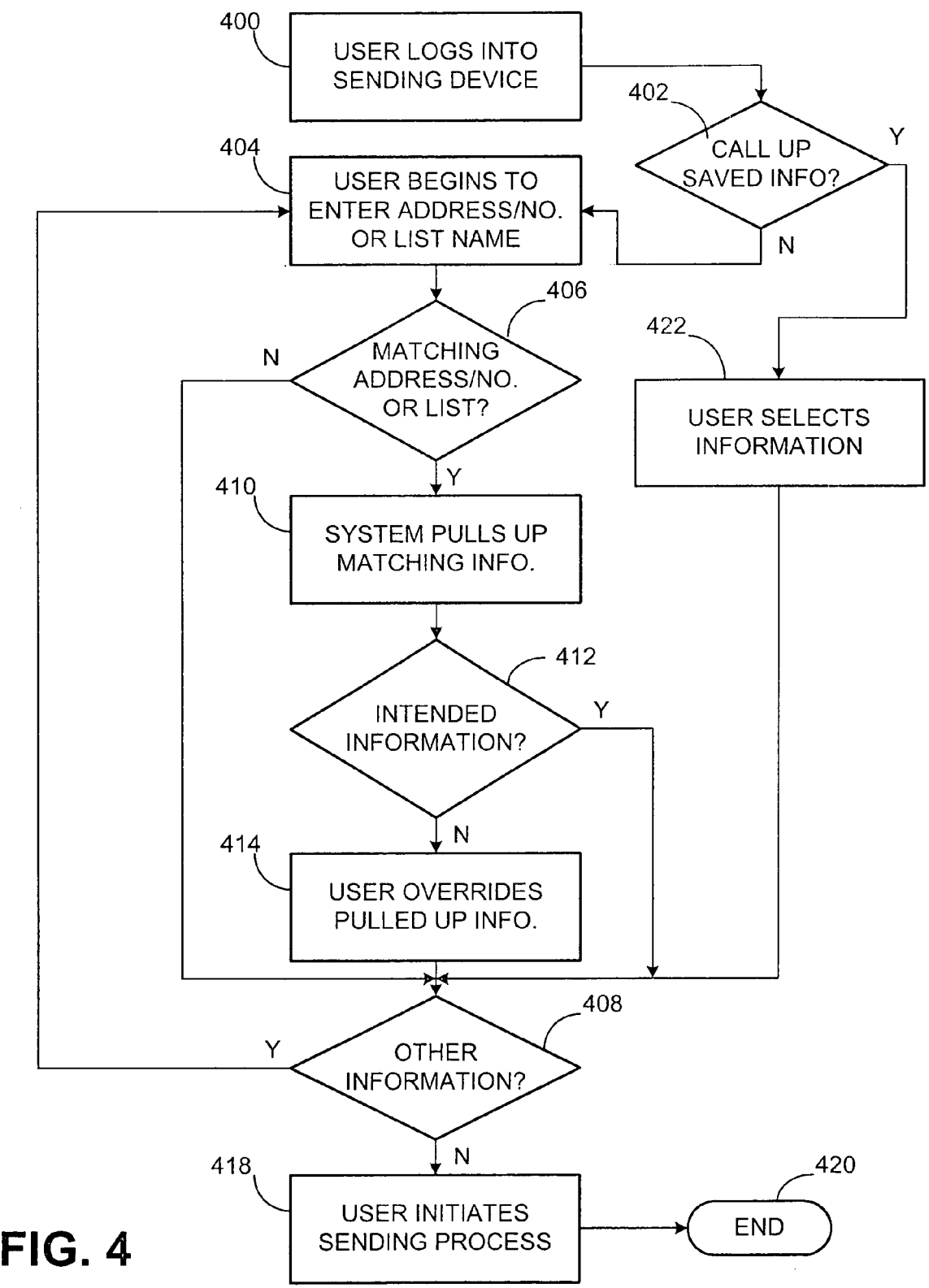
FIG. 4 is a flow diagram indicating procedures involved in sending to individual e-mail addresses and/or fax numbers in accordance with the principles of the present invention.

FIG. 4 provides a flow diagram illustrating a sending procedure used by a sending device user in accordance with the principles of the present invention. As indicated in this figure, the user logs into the sending device at block 400. Once logged in, the user is permitted to either call up a saved address, number, or distribution list from his or her address book as indicated at block 402. If the user does not choose to select such an address, number, or list in this manner, he or she can begin to enter the destination e-mail address, fax number, or list name to which the document will be transmitted as indicated at block 404. While the user is entering the address, the system cross-references with the user's address book to determine whether or not the partially entered address/number or list name matches any such address number or list name saved in the user's address book as in block 406. If not, the user will complete the address or fax number being entered, and will have the opportunity to enter further addresses/numbers or lists as indicated at block 408. If, however, the system recognizes the partially entered address/number or list, the system will automatically pull up the matching address/number or list, as indicated in block 410, as an option for the user to select. For example, as the user is typing, the system 10 will automatically fill-in the remainder of the address/number or it finds as a match. As indicated at block 412, if this address/number or list name is that which was intended by the user, the user may then continue to enter other addresses and/or numbers. If the address or number pulled up by the system is not the one intended by the user, however, the user can override the presented address/number or list name as indicated at block 414, at which time flow can return to block 408 to permit the user to add other addresses/numbers or list names.

If there are other addresses/numbers or list names to be entered by the user, the user can begin to enter this information as identified in block 416. Again, the system attempts to match the address/number or list name with one saved in the user's address book as indicated at block 406. Accordingly, flow continues in the manner described above from 406 in FIG. 4. If, on the other hand, there are no further addresses/numbers or list names to be entered, the user can then initiate the sending process as indicated in block 418 so that the document(s) is sent and the sending process is completed as indicated at block 420. With reference back to 402, if the user does wish to call up a saved address/number or list, he or she can do so by accessing his or her address book. By way of example, the user can manipulate the device to access the database containing this information and can, for example by using the keys and buttons provided on the device, select the various addresses, numbers, and/or lists which he or she desires as indicated in block 422. Once having made a selection, the user again is given the option to call up a further address, number, or list as indicated at 424 such that flow continues to 402, or can manually enter the next address, number, or list as indicated at block 416. From this point, flow continues in the manner described above from block 406.

Figure 5:
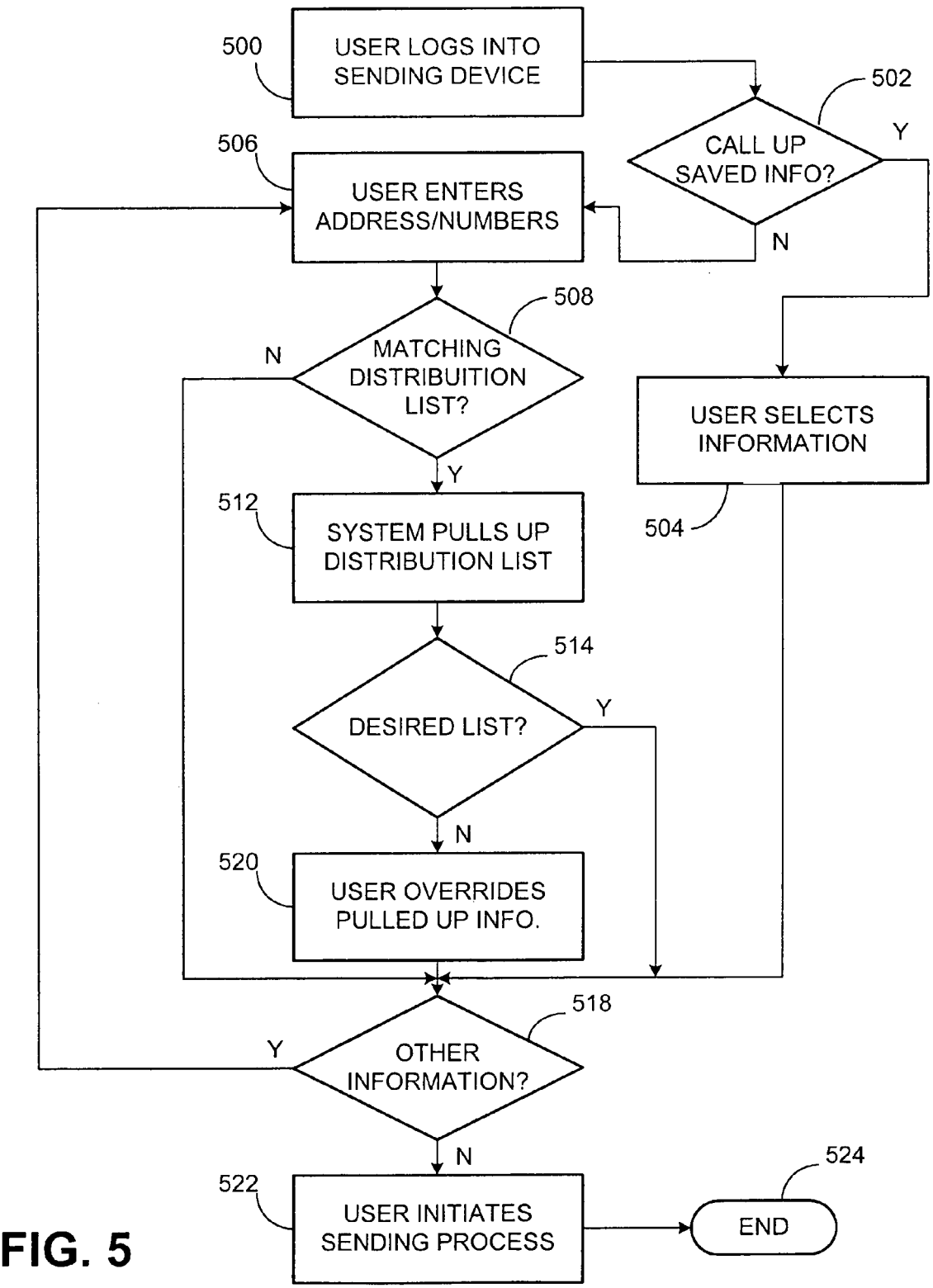
FIG. 5 is a flow diagram indicating procedures for sending to multiple e-mail addresses and/or fax numbers in accordance with the principles of the present invention.

FIG. 5 illustrates a second sending procedure in accordance with the principles of the present invention. In particular, FIG. 5 illustrates a scenario in which the system automatically calls up a distribution list for the user's consideration. As indicated in block 500, the user first logs in with the sending device. Once logged in, the user is given the option to call up a saved address, number, or list as indicated at block 502. If the user does choose one such address, number, or list, flow continues to block 504 where the user is provided with an opportunity to add to the selected address, number, or list. If, however, the user declines to call up a saved address, number, or list, the user will be permitted to enter the addresses and/or numbers of the intended recipients as indicated in block 506. Once two or more such addresses/numbers have been entered, the system will determine whether or not a saved distribution list exists which contains each of the two or more addresses/ numbers that has been entered by the user as indicated at block 508. If not, the user is permitted to continue entering addresses and/or numbers as indicated at block 510 and 506. However, if a match is found, i.e., if a distribution list is located within the user's address book which contains each of the addresses and/or numbers which the user has entered, the system pulls up the matching distribution list as indicated in block 512. As indicated at block 514, if use of the list for the present transmission is acceptable to the user, the list can be selected as indicated in block 516, and the user is prompted to enter further addresses and/or numbers as indicated at blocks 518 and 506. If the user does not wish to use the matching lists, the user can override the system as indicated in block 520 such that the user will be permitted to enter his or her own addresses, numbers, or lists. Once the user has entered the addresses and/or numbers of all the intended recipients, the user can then initiate the sending process as indicated in block 522 upon which time the document(s) is transmitted and the sending process is completed as indicated at block 524.

While particular embodiments of the invention have been disclosed in detail in the foregoing description and drawings for purposes of example, it will be understood by those skilled in the art that variations and modifications thereof can be made without departing from the spirit and scope of the invention as set forth in the following claims.

What is claimed is:

1. A method for processing sending information in a sending device, comprising:
   receiving an entry input by a user at the sending device, the entry comprising sending information that identifies a destination to which information is to be sent by the sending device;
   responsive to the entry, cross-referencing the user-entered sending information with a contacts database that contains recipient sending information of the user to determine if the user-entered sending information matches sending information saved in the contacts database, wherein the contacts database is stored within memory of the sending device; and
   automatically caching the user-entered sending information in the contacts database if the user-entered sending information has not been previously saved.

2. The method of claim 1, further comprising providing previously saved sending information to the user if it matches sending information entered by the user.

3. The method of claim 2, wherein the previously saved sending information was automatically cached by the device.

4. The method of claim 1, wherein the sending device is a digital sender capable of emailing and faxing hardcopy documents.

5. The method of claim 1, further comprising receiving a plurality of destination addresses/numbers and cross-referencing the addresses/numbers to see if a distribution list containing each is saved for the user.

6. The method of claim 1, further comprising, prior to receiving an entry input by the user, determining an identity of the user.

7. A method for processing sending information in a sending device, comprising:
   receiving an entry input by a user at the sending device, the entry comprising sending information, and determining the identity of the user from the entry;
   receiving the sending information entered by the user that identifies a destination to which information is to be sent by the sending device;
   responsive to the entry, cross-referencing the sending information entered by the user with a contacts database that contains recipient sending information of the user to determine if the user-entered sending information matches sending information saved for that user, wherein the contacts database is stored within memory of the sending device;
   providing previously saved sending information to the user as a selection option if sending information entered by the user matches the previously saved sending information; and
   automatically caching the user-entered sending information in the contacts database if the user-entered sending information has not been previously saved.

8. The method of claim 7, wherein receiving an entry input by a user at the sending device comprises receiving log in information.

9. The method of claim 7, wherein the previously saved sending information was automatically cached by the device.

10. The method of claim 7, wherein the sending device is a digital sender capable of emailing and faxing hardcopy documents.

11. The method of claim 7, further comprising receiving a plurality of destination addresses/numbers and cross-referencing the addresses/numbers to see if a distribution list containing each is saved for the user.

12. A sending information processing system, comprising:
   logic configured to receive sending information entered by a user at a sending device that identifies a destination to which electrical information is to be sent;
   logic configured to, responsive to the entry, cross-reference the user-entered sending information with a contacts database that contains recipient sending information of the user to determine if the user-entered sending information matches sending information saved for that user in the database, wherein the contacts database is stored within memory of the sending device; and logic configured to automatically cache the user-entered sending information in the contacts database if the user-entered sending information has not been previously saved.

13. The system of claim 12, further comprising logic configured to provide previously saved sending information to the user if it matches user-entered sending information.

14. The system of claim 13, wherein the previously saved sending information is obtained from the contacts database.

15. The system of claim 12, wherein the sending device is a digital sender capable of emailing and faxing hardcopy documents.

16. The system of claim 12, comprising logic configured to receive a plurality of destination addresses/numbers and cross-referencing the addresses/numbers to see if a distribution list containing each is saved for the user.

17. A sending information processing system, comprising:

means for receiving through entry by a user at a sending device sending information that indicates a destination to which information is to be sent;

means for, responsive to the entry, cross-referencing the user-entered sending information with a contacts database that contains recipient sending information of the user to determine if the user-entered sending information matches sending information saved in the database for that user, wherein the contacts database is stored within memory of the sending device; and means for automatically caching the user-entered sending information in the contacts database if the user-entered sending information has not been previously saved.

18. The system of claim 17, further comprising means for providing previously saved sending information to the user if it matches sending information entered by the user.

19. The system of claim 18, wherein the previously saved sending information is obtained from the contacts database.

20. The system of claim 17, wherein the sending device is a digital sender capable of emailing and faxing hardcopy documents.

21. The system of claim 17, comprising logic configured to receive a plurality of destination addresses/numbers and cross-referencing the addresses/numbers to see if a distribution list containing each is saved for the user.

* * * * *